F. A. ERRINGTON.
MULTIPLE TAPPING DEVICE AND SIMILAR TOOL.
APPLICATION FILED SEPT. 23, 1914.
1,226,486.
Patented May 15, 1917.
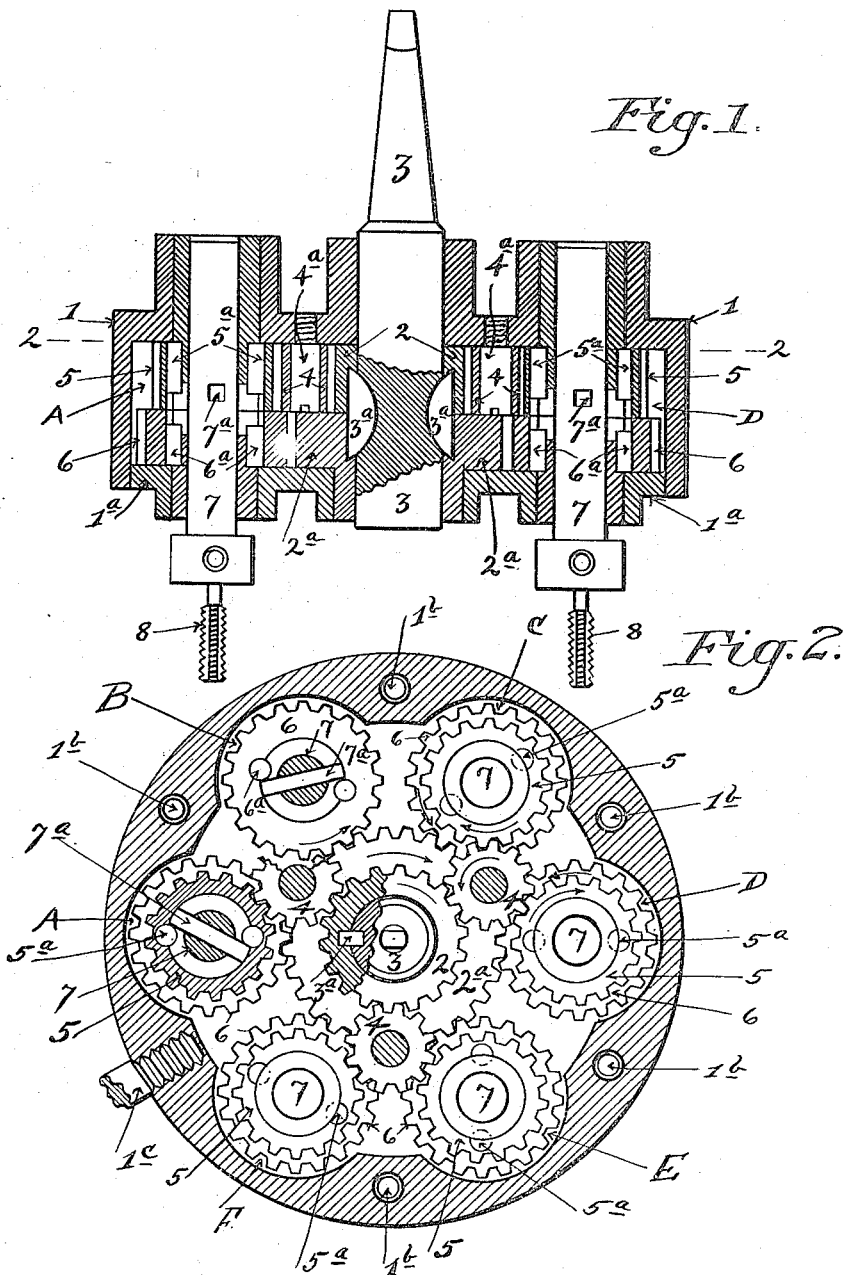

UNITED STATES PATENT OFFICE.

FRANKLIN A. ERRINGTON, OF STAPLETON, NEW YORK.

MULTIPLE TAPPING DEVICE AND SIMILAR TOOL.

1,226,486.    Specification of Letters Patent.    Patented May 15, 1917.

Application filed September 23, 1914. Serial No. 863,200.

*To all whom it may concern:*

Be it known that I, FRANKLIN ALFRED ERRINGTON, a citizen of the United States, residing at Stapleton, in the county of Richmond and State of New York, have invented certain new and useful Improvements in Multiple Tapping Devices and Similar Tools, of which the following is a specification.

My invention relates broadly to multiple tapping devices for attachment to a one spindle drill press or similar machine thereby actuating a double-depth main driving gear suitably journaled in the non-rotary case of my device; this double-depth main driving gear drives a plurality of supplementary tapping units journaled in said case at suitable distances apart, each tapping unit consisting of a supplementary driving gear and a supplementary reversing gear, each having a suitable clutch to engage a clutch carried by a tapping spindle journaled in said gears and movable longitudinally thereof, to drive a tap carried by said spindle alternately in opposite directions; and more particularly to means for driving said plurality of tapping spindles at a comparatively slow speed while the tap is cutting the threads in the work, means to stop said tap automatically when the work is completed and means to reverse the direction of rotation of said tap and to withdraw it from the work at a much higher speed; and my invention further consists in the novel details of improvement and combination of parts that will be more fully hereinafter set forth and then pointed out in the claims.

Reference is to be had to the accompanying drawings, forming a part hereof, wherein:—Figure 1 represents a vertical cross-section of a device embodying my invention, the parts being shown in the driving position; Fig. 2 is a top plan view of the device, the case being shown in section on the line 2—2 of Fig. 1 and the internal mechanism in full lines, except where partly sectioned to illustrate more clearly the various connections between the several parts; and attention is called to the fact that all the tapping spindles will be simultaneously in the same relative position during the same periods of the operations, although I have shown in Fig. 2 one tapping unit with its clutch-bar in the driving position in unit A, whereas in unit B the clutch-bar is illustrated in its reversing position.

Similar numerals and letters of reference indicate corresponding parts in the several views.

A non-rotative case is shown in two sections 1, 1ª, held together by suitable screws, as indicated at 1ᵇ, said case being held from rotation by a rod 1ᶜ. A main double-depth driving gear is preferably made up of two separate gears 2, 2ª, keyed to a main driving spindle 3 by keys 3ª, in such a manner that the upper and lower sections 2, 2ª rotate in unison with each other and with spindle 3, the latter being adapted at its outer end for connection with the spindle of a drill press or similar machine, the device being adapted for use in either a vertical or horizontal position. The upper portion 2, of the double-depth main driving gear 2, 2ª is preferably of less diameter than the lower portion 2ª, which arrangement is designed to provide a quick-return movement to the tapping units hereinafter described. A plurality of pinions 4 are journaled on axles 4ª, carried by case 1, said pinions meshing with the upper portion 2 of the main driving gear, and also with the supplementary driving gears 5, of a plurality of tapping units A, B, C, D, E, F, said tapping units having each a reversing gear 6, meshing directly with the lower section 2ª of the main driving gear; whereby said supplementary driving and reversing gears are rotated in opposite directions to each other, the supplementary driving gears being rotated in the same direction as the main driving gear 2, 2ª, and the reversing gears being rotated in the opposite direction to their respective driving gears and at an increased speed (see Fig. 2). A tapping spindle 7 is provided in each unit, having a clutch-bar 7ª, for engagement with suitable clutches 5ª, 6ª, carried by the supplementary driving and reversing gears. The lower or outer ends of the spindles 7 are adapted to grip a tap 8, or similar tool.

Each of the tapping units herein shown and described has its supplementary driving-gear of smaller diameter than its associate supplementary reversing-gear, which is exactly contrary to the usual design of individual tapping devices. By this novel design the rigidity of the alinement of the case during the driving operation is greatly enhanced by the enlarged surface of the lower section of the main driving-gear, as the thrust of the tools against the work is received against the lower (or outer) face of this gear.

It will therefore readily be seen that when my device is lowered against the work, the tapping spindles 7 will slide up into the driving or tapping position with the clutch-bar 7ª in mesh with the driving clutches 5ª of the supplementary driving gears 5, and the taps 8 will be driven into the work until the advance of the case 1 is arrested by any suitable means, whereupon the spiral action of the taps 8 in the work will pull the clutch-bars 7ª out of mesh with the clutches 5ª, and the taps 8 will cease to rotate. The device can then be raised away from the work, which will bring the clutch bars 7ª into mesh with the reversing clutches 6ª, and the taps 8 will thereby be reversed out of the work with a quick-return.

Having now described my invention what I claim is:—

1. The combination with a non-rotary case having a double-depth main driving gear suitably journaled therein, a plurality of pinions meshing with the upper portion of said main driving gear and journaled upon a corresponding plurality of axles carried by said case, of a plurality of supplementary tapping units suitably supported by said case to rotate therein, each of said units having a supplementary driving gear and a supplementary reversing gear, the opposed faces of each of said gears being provided with a clutch adapted to engage an intermediate clutch carried by a reversible spindle, said spindle being journaled axially of said supplementary gears and movable longitudinally thereof to engage said clutches alternately, the supplementary driving gear of each of said units meshing with the adjacent one of said pinions to turn the supplementary driving gear in the same direction as the main driving gear, and the supplementary reversing gear of each of said units meshing directly with the lower portion of the main driving gear to turn the supplementary reversing gears in the direction opposite to that of the double-depth main driving gear, substantially as described.

2. The combination with a non-rotary case having a double depth main driving gear suitably journaled therein, the lower portion of said gear being of greater diameter than the upper portion thereof, a plurality of pinions meshing with the upper portion of said main driving gear and journaled upon a corresponding plurality of axles carried by said case, of a plurality of supplementary tapping units suitably supported by said case, each of said units consisting of a supplementary driving gear and a supplementary reversing gear, the opposed faces of each of said gears being provided with a clutch adapted to engage alternately with an intermediate clutch carried by a reversible spindle, said spindle being journaled axially of said supplementary gears and movable longitudinally thereof, the supplementary driving gear of each of said units meshing with the adjacent one of said pinions to turn the supplementary driving gear in the same direction as the main driving gear, and the supplementary reversing gear of each of said units meshing directly with the enlarged lower portion of said main driving gear to turn the supplementary reversing gears in a direction opposite to that of the main driving gear and at a greater velocity than their respective supplementary driving gears, substantially as described.

3. The combination with a non-rotary case having driving and reversing gears journaled therein and having their axes in line with each other, the driving-gear being of smaller diameter than the reversing-gear, a spindle journaled in said gears and movable longitudinally thereof, the opposing faces of said gears having clutches to engage an intermediate clutch carried by and adapted to connect said spindle alternately with either of said gears, and said case being provided with suitable mechanism to rotate said gears in opposite directions and the reversing-gear at a greater velocity than that of the driving-gear, substantially as described.

Stapleton, Staten Island, N. Y., Sept. 19th, 1914.

FRANKLIN A. ERRINGTON.

Witnesses:
F. J. GOODRICK,
AUGUST C. STOCK.